(12) United States Patent
Higashi et al.

(10) Patent No.: US 6,204,571 B1
(45) Date of Patent: Mar. 20, 2001

(54) MULTIPLE POWER SUPPLY UNIT WITH IMPROVED OVERCURRENT SENSITIVITY

(75) Inventors: Shinya Higashi; Kazuhiro Ito, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/541,051

(22) Filed: Mar. 31, 2000

(30) Foreign Application Priority Data

Mar. 31, 1999 (JP) .................................................. 11-094330

(51) Int. Cl.[7] ........................................................ H02J 1/10
(52) U.S. Cl. ................................................. 307/58; 307/82
(58) Field of Search ........................... 363/71, 72; 307/82, 307/83, 580

(56) References Cited

U.S. PATENT DOCUMENTS

| | | | |
|---|---|---|---|
| 5,036,452 | * | 7/1991 | Loftus ..................................... 363/71 |
| 5,212,630 | * | 5/1993 | Yamamoto et al. ................... 363/71 |

* cited by examiner

*Primary Examiner*—Shawn Riley
(74) *Attorney, Agent, or Firm*—Finnegan, Henderson, Farabow, Garrett & Dunner, L.L.P.

(57) ABSTRACT

A multiple power supply unit includes two DC stabilized power supplies that provide electrical power in parallel to a load, each power supply providing its own operation indication to the other power supply. Each power supply changes a reference voltage used to detect excess current of its own output to the load according to whether the operation indication is received from the other power supply.

23 Claims, 4 Drawing Sheets

MULTIPLE POWER SUPPLY UNIT WITH IMPROVED OVERCURRENT SENSITIVITY

BACKGROUND OF THE INVENTION

I. Field of the Invention

The present invention generally relates to a multiple power supply unit comprising a plurality of DC stabilized power supplies that provides a constant voltage in parallel to a single common load.

More particularly, the present invention relates to a multiple power supply unit comprising a plurality of DC stabilized power supplies, each power supply having improved sensitivity to an overcurrent state of output current to the single common load during operation.

II. Background and Material Information

FIG. 3 is a block diagram depicting the configuration of a conventional DC stabilized power supply unit, namely, a DC/DC converter 300.

DC/DC converter 300 comprises a DC voltage supply 1, a switching element 2, a transformer 3, diodes 4, 5, and 6, an inductor 7, an electrolytic capacitor 8, a sense resistor 9, and a load 10. Sense resistor 9 is connected between a negative electrode of transformer 3 and load 10. An overcurrent detection circuit 11 is connected to both ends of sense resistor 9. Overcurrent detection circuit 11 comprises an amplification circuit 12, a resistor 13, a comparator 14, and a Zener diode 15, and detects excess current based on a voltage across sense resistor 9. Amplification circuit 12 comprises an amplifier 16, and resistors 17 and 18. An output from overcurrent detection circuit 11 (hereinafter referred to as an "overcurrent signal") is inputted to an alarm latch circuit 19. When receiving an output from alarm latch circuit 19 (hereinafter referred to as an "alarm signal"), a voltage control circuit 20 controls switching element 2 to stop generating pulses.

Next, the operation of overcurrent detection circuit 11 will be described. An amplified voltage across sense resistor 9, which corresponds to an output current to load 10, is compared with a reference voltage $V_z$, by comparator 14. The reference voltage $V_z$ is a value used to determine whether the output current is in a state of overcurrent. That is, when the voltage across sense resistor 9 exceeds the reference voltage $V_z$, the output current is determined to be in a state of overcurrent.

When detecting the state of overcurrent, overcurrent detection circuit 11 outputs the overcurrent signal to alarm latch circuit 19. Alarm latch circuit 19 holds the overcurrent state and releases the state when it receives a release signal from another circuit (not shown in FIG. 3). While alarm latch circuit 19 holds the overcurrent state, voltage control circuit 20 outputs the alarm signal which causes switching element 2 to switch off. When the input is cut off in this way, DC/DC converter 300 shifts to a state in which it provides no output.

Recently, an electronic device in which two DC/DC converters are connected in parallel to a single common load to achieve improved reliability, has been provided. In this device, even when one of the DC/DC converters fails, the other continues to provide a load with a constant voltage. Therefore, this device can be used in a computer system which requires continuous operation, such as a non-stop server computer.

FIG. 4 is an exemplary graph depicting the volt-ampere characteristic of two DC/DC converters. In this device, while both DC/DC converters provide power to the load (hereinafter referred to as "two converter operation") in parallel, the output current from each DC/DC converter is one-half of the value output when a single DC/DC converter provides power to the load (hereinafter referred as to "single converter operation"). However, in this case of both converters being provided as DC/DC converter 300, even if the output current is one-half during two converter operation, the reference voltage $V_z$ is the same as during single converter operation. As a result, the sensitivity of each of the two DC/DC converters to an overcurrent state of output is deteriorated during double operation.

Therefore, there is a need for a high-reliability multiple power supply unit, which maintains its sensitivity to an overcurrent state of output even when two DC stabilized power supply units are connected in parallel to a single common load.

SUMMARY OF THE INVENTION

In view of the foregoing, the present invention solves the problem in the art related to the sensitivity to an overcurrent by providing a multiple power supply unit. The multiple power supply unit comprises a plurality of individual power supplies, including first and second power supplies, which provide electrical power in parallel to a load. Each individual power supply includes: an overcurrent detection circuit for detecting excess output current to the load relative to a reference value, means for providing an operation indication of the individual power supply, each of the first and second power supplies coupled to receive the operation indication of the second and first power supplies, respectively, and a reference value circuit for changing the reference value when the operation indication is received.

Also in accordance with the present invention, there is provided a multiple power supply unit. The multiple power supply unit comprises a plurality of individual power supplies, including first and second power supplies, which provide electrical power in parallel to a load. Each individual power supply includes: means for detecting excess output current to the load relative to a reference value, means for providing an operation indication of the individual power supply, each of the first and second power supplies coupled to receive the operation indication of the second and first power supplies, respectively, and means for changing the reference value when the operation indication is received.

Further in accordance with the present invention, there is provided a multiple power supply unit. The multiple power supply unit comprises first and second power supplies which provide electrical power in parallel to a load. Each power supply includes: a transformer including a primary circuit and a secondary circuit, the primary circuit connecting to a power source, and the secondary circuit connecting to the load, means for extracting a voltage generated across a resistor in the secondary circuit, means for detecting excess output current to the load by comparing the generated voltage to a reference voltage, means for controlling an input to the primary circuit from the power source, based on whether the excess current is detected, means for providing an operation indication of the power supply, each of the first and second power supplies coupled to receive the operation indication of the second and first power supplies, respectively, and means for changing the reference voltage when the operation indication is received.

Additionally in accordance with the present invention, there is provided a power supply. The power supply for use in a multiple power supply unit that includes a plurality of the power supplies which provide electrical power in parallel to a load. The power supply comprises: an overcurrent detection circuit for detecting excess output current to the load relative to a reference value, means for providing an operation indication of the power supply to another one of the power supplies, means for receiving the operation indication from another one of the power supplies, and a reference value circuit for changing the reference value when the operation indication is received.

Also in accordance with the present invention, there is provided a power supply. The power supply for use in a multiple power supply unit that includes a plurality of the power supplies which provide electrical power in parallel to a load. The power supply comprises: means for detecting excess output current to the load relative to a reference value, means for providing an operation indication of the power supply to another one of the power supplies, means for receiving the operation indication from another one of the power supplies, and means for changing the reference value when the operation indication is received.

Further in accordance with the present invention, there is provided a power supply for use in a multiple power supply unit that includes first and second power supplies which provide electrical power in parallel to a load. The power supply comprises: a transformer including a primary circuit and a secondary circuit, the primary circuit connecting to a power source, and the secondary circuit connecting to the load, means for extracting a voltage generated across a resistor in the secondary circuit, means for detecting excess output current to the load by comparing the generated voltage to a reference voltage, means for controlling an input to the primary circuit from the power source, based on whether the excess current is detected, means for providing an operation indication of the power supply, each of the first and second power supplies to receive the operation indication of the second and first power supplies, respectively, and means for changing the reference voltage when the operation indication is received.

BRIEF DESCRIPTION OF THE DRAWINGS

The accompanying drawings, which are incorporated in and constitute a part of this specification, illustrate various embodiments and/or features of the invention and together with the description, serve to explain the principles of the invention. In the drawings.

DETAILED DESCRIPTION

The various aspects and features of the present invention will be hereinafter described with reference to the accompanying drawings.

Figure 1:
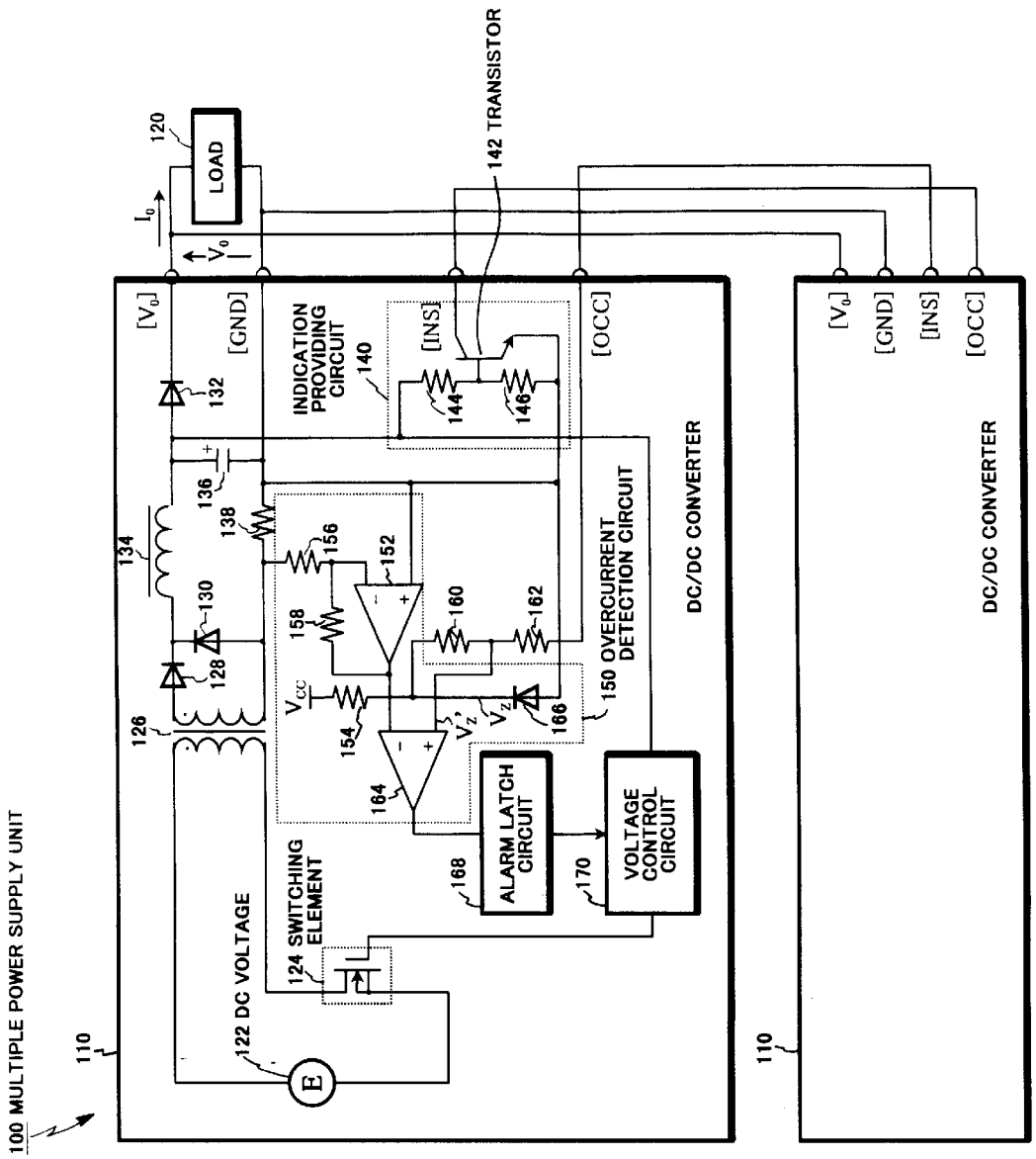
FIG. 1 is an exemplary block diagram depicting the configuration of a multiple power supply unit according to the principles of the present invention.

FIG. 1 is an exemplary block diagram depicting the configuration of a multiple power supply unit 100, according to the principles of the present invention.

Multiple power supply unit 100 comprises two individual DC/DC converters 110 that are substantially the same and connected in parallel with a single common load 120. DC/DC converter 110 comprises a DC voltage supply 122, a switching element 124, a transformer 126, diodes 128, 130, and 132, an inductor 134, a smoothing electrolytic capacitor 136, and a sense resistor 138. Sense resistor 138 is connected between a negative electrode of transformer 126 and load 120. An indication providing circuit 140 comprises a transistor 142, and resistors 144 and 146. Resistors 144 and 146 are connected in series, and a base of transistor 142 is connected to a connection point between resistors 144 and 146. Indication providing circuit 140 is connected between an input side of diode 132 and a ground terminal [GND].

Indication providing circuit 140 provides an indication (hereinafter referred to as an "operation indication") of the operation of DC/DC converter 110 with which it is associated to the other DC/DC converter 110 of unit 100. Thus, the operation indication is transmitted from one of DC/DC converters 110 to the other DC/DC converter 110. Each DC/DC converter 110 includes an output terminal [INS], connected to transistor 142, and an input terminal [OCC]. The [INS] and [OCC] of one DC/DC converter 110 are respectively connected with the [OCC] and [INS] of the other, so that each DC/DC converter 110 can transmit the operation indiation to the other.

An overcurrent detection circuit 150 is connected to both ends of sense resistor 138. Overcurrent detection circuit 150 comprises amplifier 152, and resistors 154, 156, 158, 160, and 162, a comparator 164, and a Zener diode 166, and detects excess current based on the voltage across sense resistor 138. A supply voltage $V_{CC}$ is connected to resistor 154 and input terminal [OCC] is connected to resistor 162. Overcurrent detection circuit 150 outputs an overcurrent signal to an alarm latch circuit 168 which, in turn, provides an output signal to a voltage control circuit 170. In response to the overcurrent signal held in latch circuit 168, voltage control circuit 170 controls switching element 124 to stop generating pulses. Voltage control circuit 170 also controls the output voltage to load 120 based on a voltage at an input side of diode 132.

Next, an operation of this embodiment will be described.

When each DC/DC converter 110 normally operates, the voltage at the input side of diode 132 is applied to transistor 142 via resistor 144 and transistor 142 in turned on, i.e., becomes conductive. While both DC/DC converters 110 operate, current flows from supply voltage $V_{CC}$ to the [OCC] through resistors 154, 160, and 162. Subsequently, the current flows from the [OCC] of DC/DC converter 110 to the [GND] of the other DC/DC converter 110 via the [INS] of the other DC/DC converter 110 and transistor 142 of the other DC/DC converter 110.

In other words, each DC/DC converter 110 transmits a low level signal, such as 0.0V–0.6V, as an operation indication via its own output terminal [INS] to the input terminal [OCC] of the other DC/DC converter 110. Meanwhile, each DC/DC converter 110 receives the low level signal via its own [OCC] from the [INS] of the other DC/DC converter 110.

A voltage generated at a connection point between resistors 160 and 162 is inputted to comparator 164 as a reference voltage $V_z'$.

In overcurrent detection circuit 150, the voltage across sense resistor 138 amplified by amplifier 152 is compared with the reference voltage $V_z'$ by comparator 164. When the voltage across sense resistor 138 exceeds the reference voltage $V_z'$, it is determined that DC/DC converter 110 is providing load 120 with excess current.

When detecting the state of overcurrent, overcurrent detection circuit 150 outputs the overcurrent signal to alarm latch circuit 168. Alarm latch circuit 168 holds the overcurrent signal and is in an overcurrent state. Alarm latch circuit 168 releases the state when it receives a release signal from another circuit (not shown in FIG. 1). While alarm latch circuit 168 is in the overcurrent state, voltage control circuit 170 outputs a signal controlling switching element 124 to switch off. As a result of the input to transformer 126 being cut off in this way, DC/DC converter 110 shifts to a state in which it provides no output.

If resistance values of resistors 160 and 162 are set equal to each other, the reference voltage $V_Z'$ is one-half of a reference voltage $V_Z$, which is the reference value during single converter operation. When only one DC/DC converter 110 provides power supply during single converter operation, its own [OCC] is open. Therefore, current flows from the supply voltage $V_{CC}$ to its own [GND] through resistor 154 and Zener diode 166, and does not flow to its own [OCC] through resistors 154, 160, and 162. As a result, the reference voltage of DC/DC converter 110 during single converter operation is twice the voltage which is determined by dividing the supply voltage $V_{CC}$ based on a ratio of resistor 154 to Zener diode 166, namely, $V_Z'$, which is the reference voltage during two converter operation.

Figure 4:
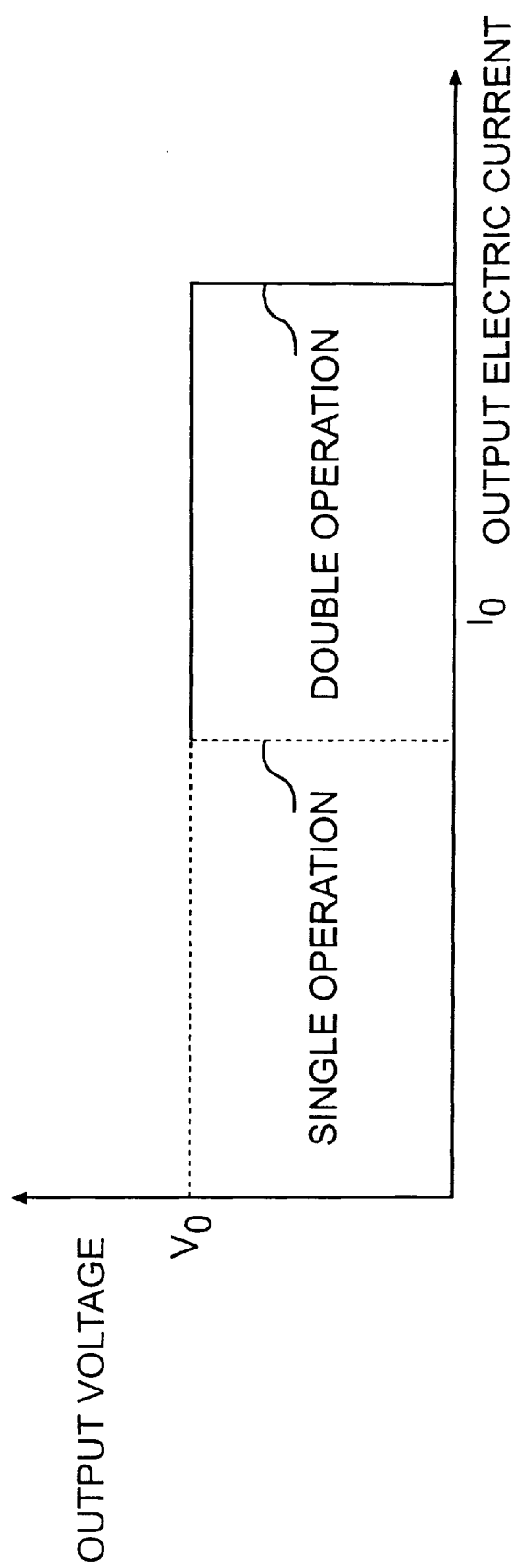
FIG. 4 is an exemplary graph depicting the volt-ampere characteristic of two DC/DC converters.

As shown in FIG. 4, the output current from conventional DC/DC converter 300 during two converter operation is one-half the output during single converter operation. However, the reference voltage $V_Z$ of overcurrent detection circuit 150 is the same. On the other hand, in DC/DC converter 110, the reference voltage $V_Z'$ of overcurrent detection circuit 150 during two converter operation is one-half the voltage $V_Z$ during single converter operation. Therefore, even during two converter operation, overcurrent detection circuit 150 has the same sensitivity to an overcurrent state of output during single converter operation.

Figure 2:
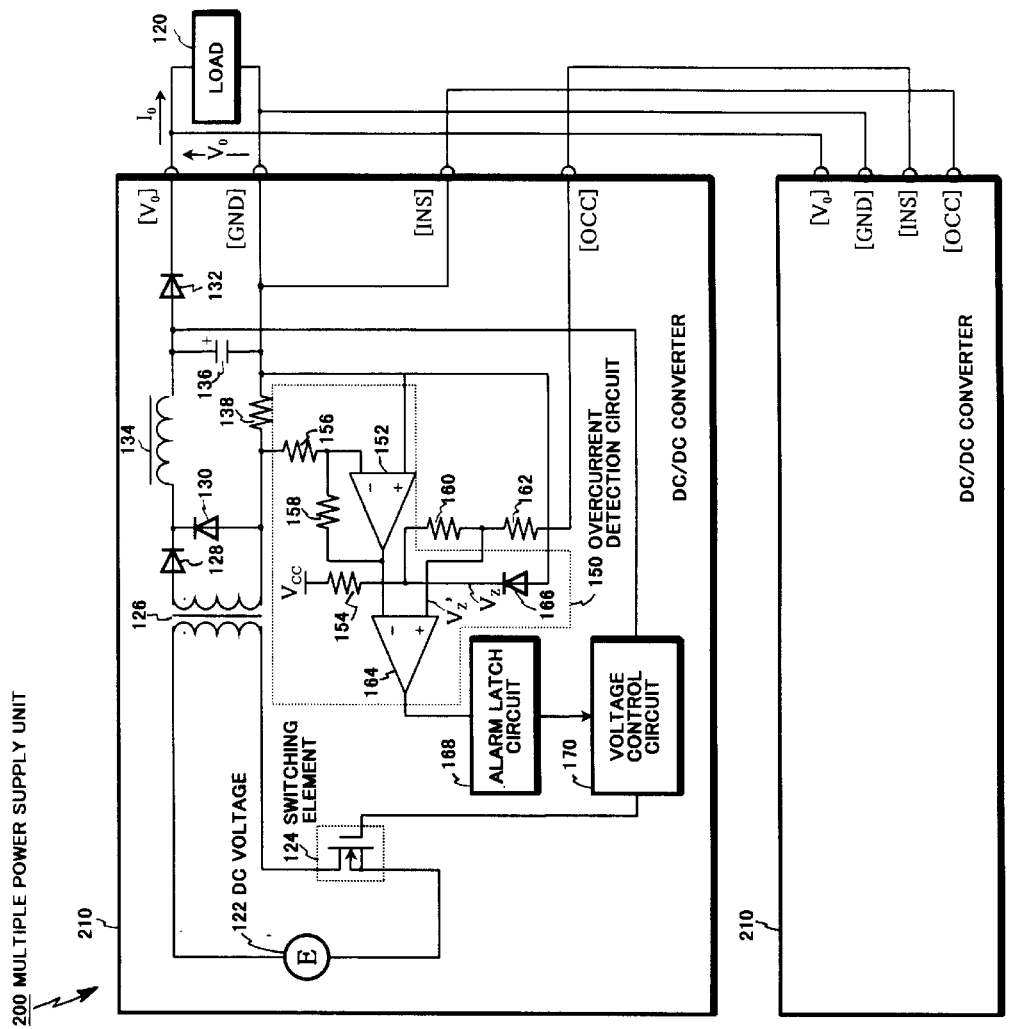
FIG. 2 is another exemplary block diagram depicting the configuration of a multiple power supply unit according to the principles of the present invention.
Figure 3:
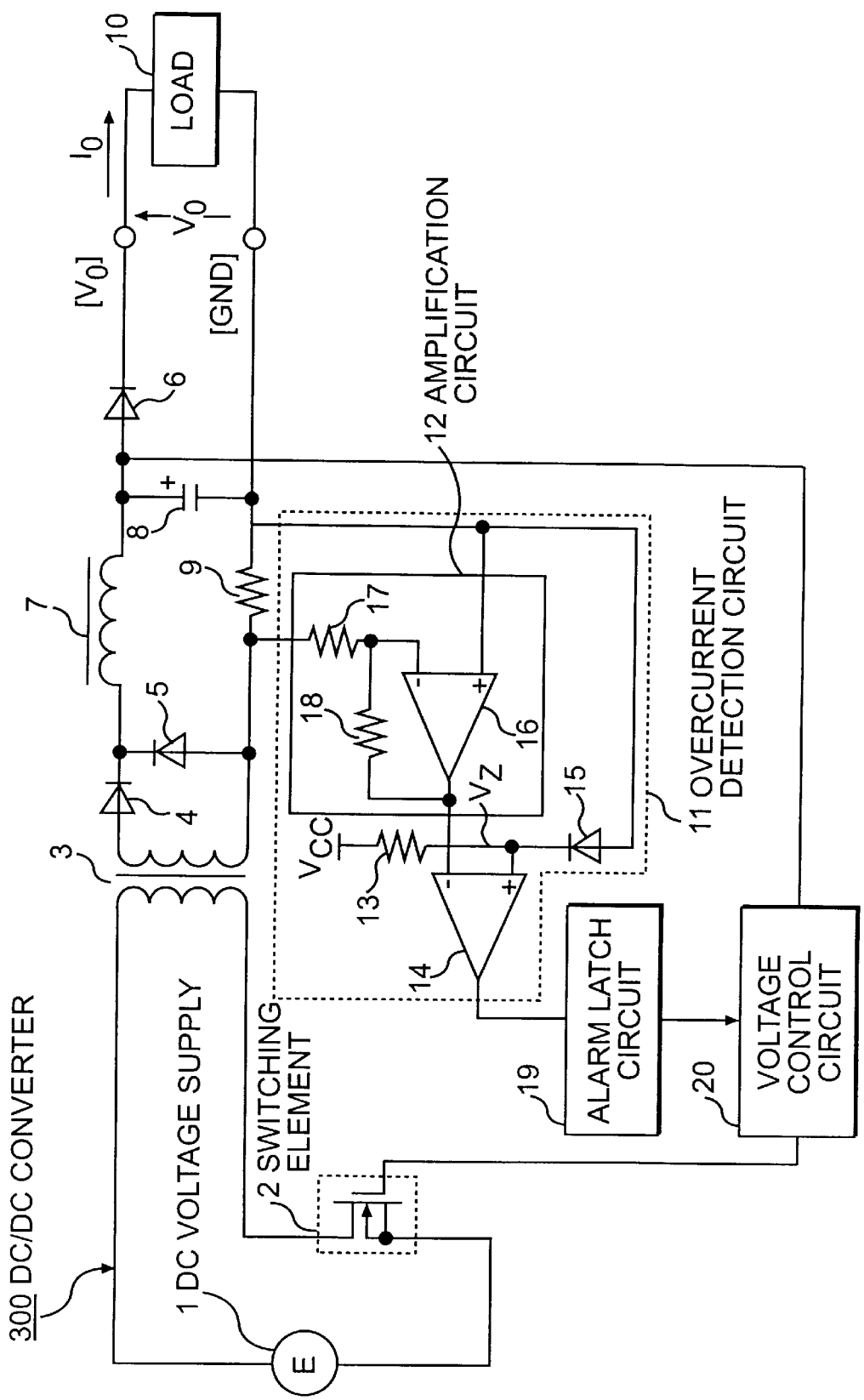
FIG. 3 is a block diagram depicting the configuration of a conventional DC stabilized power supply unit.

FIG. 2 is another exemplary block diagram depicting the configuration of a multiple power supply unit 200, according to the principles of the present invention.

Multiple power supply unit 200 comprises two individual DC/DC converters 210 that are substantially the same and connected in parallel to single common load 120.

DC/DC converter 210 comprises components that are the same as those of DC/DC converter 110 including DC voltage supply 122, switching element 124, transformer 126, diodes 128, 130, and 132, inductor 134, smoothing electrolytic capacitor 136, sense resistor 138. Sense resistor 138 is connected between a negative electrode of transformer 126 and load 120. An operation indication is transmitted from one of DC/DC converters 210 to the other DC/DC converter 210. Each DC/DC converter 210 includes output terminal [INS], connected to the common connection between capacitor 136 and resistor 138, and input terminal [OCC]. The [INS] and [OCC] of one DC/DC converter 210 are respectively connected with the [OCC] and [INS] of the other, so that each DC/DC converter 210 can transmit a multiple operation recognition signal to the other.

Overcurrent detection circuit 150 is connected to both ends of sense resistor 138. Overcurrent detection circuit 150 comprises amplifier 152, and resistors 154, 156, 158, 160, and 162, comparator 164, and Zener diode 166, and detects excess current based on the voltage across sense resistor 138. Supplying voltage $V_{CC}$ is connected to resistor 154 and input terminal [OCC] is connected to resistor 162, overcurrent detection circuit 150 outputs an overcurrent signal to alarm latch circuit 168, which, in turn, provides an output signal to voltage control circuit 170. In response to the overcurrent signal held in alarm latch circuit 168, voltage control circuit 170 controls switching element 124 to stop generating pulses.

Next, an operation of this embodiment will be described.

When each DC/DC converter 210 normally operates, a voltage at its own input terminal [GND] is outputted as the operation indication via its own output terminal [INS] to the input terminal [OCC] of other DC/DC converter 210. Meanwhile, each DC/DC converter 210 receives the voltage at terminal [GND] of the other DC/DC converter 210 via its own input terminal [OCC].

In this case, current flows from supply voltage $V_{CC}$ to the [OCC] through resistors 154, 160, and 162. A voltage generated at a connection point between resistors 160 and 162 is inputted to comparator 164 as reference voltage $V_Z'$.

In overcurrent detection circuit 150, the voltage across sense resistor 138 amplified by amplifier 152 is compared with the reference voltage $V_Z'$ by comparator 164. When the voltage across sense resistor 138 exceeds the reference voltage $V_Z'$, it is determined that DC/DC converter 210 is providing load 10 with excess current.

When detecting the state of overcurrent, overcurrent detection circuit 150 outputs the overcurrent signal to alarm latch circuit 168. Alarm latch circuit 168 holds the overcurrent signal and is in an overcurrent state. Alarm latch circuit 168 releases the state when it receives a release signal from another circuit (not shown in FIG. 2). While alarm latch circuit 168 is in the overcurrent state, voltage control circuit 170 outputs a signal controlling switching element 124 switch off. As a result of the input to transformer 126 being cut off in this way, DC/DC converter 210 shifts to a state in which it provides no output.

If resistance values of resistors 160 and 162 are set equal to each other, the reference voltage $V_Z'$ is one-half of a reference voltage $V_Z$, which is the reference value during single converter operation. When only one DC/DC converter 210 provides power supply during single converter operation, its own input terminal [OCC] is open. Therefore, current flows from the supply voltage $V_{CC}$ to its own terminal [GND] through resistor 154 and Zener diode 166, and does not flow to its own input terminal [OCC] through resistor 154, 160, and 162. As a result, the reference voltage of DC/DC converter 210 during single converter operation is twice the voltage which is calculated by dividing the supply voltage $V_{CC}$ based on a ratio of resistor 154 to Zener diode 166, namely, $V_Z'$, which is the reference voltage during two converter operation.

As shown in FIG. 4, the output current from DC/DC converter 300 during two converter operation is one-half the output during single converter operation. However, the reference voltage $V_Z$ of overcurrent detection circuit 150 is same. On the other hand, in DC/DC converter 210, the reference voltage $V_Z'$ of overcurrent detection circuit 150 during two converter operation is one-half the reference voltage $V_Z$ during single converter operation. Therefore, even during two converter operation, overcurrent detection circuit 150 has the same sensitivity to an overcurrent state of output during single converter operation.

As described above, consistent with the principles of the present invention, each DC stabilized power supply unit recognizes a state of two converter operation when receiving an operation indication from the other DC stabilized power supply unit. In response, the DC stabilized power supply unit corrects its reference voltage for detecting excess current to a value suitable for two converter operation.

Therefore, the sensitivity to an overcurrent state of output to a load during two converter operation is the same as during single converter operation.

While embodiments of the present invention have been disclosed including two DC/DC converters, the invention is not so limited. The principle of the invention can be practiced in multiple power supply unit comprising three or more DC/DC converters.

Other embodiments of the present invention will be apparent to those skilled in the art from consideration of the specification and practice of the invention disclosed herein. It is intended that the specification and examples be considered as exemplary only, with a true scope and spirit of the present invention being indicated by the following claims.

What is claimed is:

1. A multiple power supply unit, comprising:
    a plurality of individual power supplies, including first and second power supplies, which provide electrical power in parallel to a load, each individual power supply including
    an overcurrent detection circuit for detecting excess output current to the load relative to a reference value,
    means for providing an operation indication of the individual power supply, each of the first and second power supplies coupled to receive the operation indication of the second and first power supplies, respectively, and
    a reference value circuit for changing the reference value based on a total number of individual power supplies from which the operation indication is received.

2. The unit of claim 1, wherein each individual power supply further comprises:
    an output terminal on which the providing means provides the operation indication; and
    an input terminal on which the reference circuit of the first and second power supply receives the operation indication of the second and first power supply, respectively;
    wherein the output terminal and input terminal of the first power supply are respectively coupled to the input terminal and output terminal of the second power supply.

3. The unit of claim 1, wherein the providing means comprises a transistor.

4. The unit of claim 1, wherein the providing means of the first or second power supply provides a ground potential to the second or first power supply, respectively.

5. The unit of claim 1, wherein:
    the unit has only the first and second power supplies, and
    the reference value circuit sets the reference value for single converter operation at twice the reference value for two converter operation.

6. A multiple power supply unit, comprising:
    a plurality of individual power supplies, including first and second power supplies, which provide electrical power in parallel to a load, each individual power supply including
    means for detecting excess output current to the load relative to a reference value,
    means for providing an operation indication of the individual power supply, each of the first and second power supplies coupled to receive the operation indication of the second and first power supplies, respectively, and
    means for changing the reference value based on a total number of individual power supplies from which the operation indication is received.

7. A multiple power supply unit, comprising:
    first and second power supplies which provide electrical power in parallel to a load, each power supply including
    a transformer including a primary circuit and a secondary circuit, the primary circuit connecting to a power source, and the secondary circuit connecting to the load;
    means for extracting a voltage generated across a resistor in the secondary circuit;
    means for detecting excess output current to the load by comparing the generated voltage to a reference voltage;
    means for controlling an input to the primary circuit from the power source, based on whether the excess current is detected;
    means for providing an operation indication of the power supply, each of the first and second power supplies coupled to receive the operation indication of the second and first power supplies, respectively; and
    means for changing the reference voltage based on a total number of individual power supplies from which the operation indication is received.

8. The unit of claim 7, wherein the controlling means comprises:
    means connected to the power source for switching the input to the primary circuit; and
    means for controlling the switching means to cut off the input to the primary circuit when the excess current is detected.

9. The unit of claim 7, wherein each power supply further comprises:
    an output terminal on which the providing means provides the operation indication; and
    an input terminal on which the changing means of the first and second power supply receives the operation indication of the second and first power supply, respectively;
    wherein the output terminal and input terminal of the first power supply are respectively coupled to the input terminal and output terminal of the second power supply.

10. The unit of claim 7, wherein the providing means comprises a transistor.

11. The unit of claim 7, wherein the providing means of the first or second power supply provides a ground potential to the second or first power supply, respectively.

12. The unit of claim 7, wherein the changing means sets the reference voltage for single converter operation at twice the reference voltage for two converter operation.

13. A power supply for use in a multiple power supply unit that includes a plurality of the power supplies which provide electrical power in parallel to a load, the power supply comprising:
    an overcurrent detection circuit for detecting excess output current to the load relative to a reference value;
    means for providing an operation indication of the power supply to another one of the power supplies;
    means for receiving the operation indication from another one of the power supplies; and
    a reference value circuit for changing the reference value based on a total number of individual power supplies from which the operation indication is received.

14. The power supply of claim 13, wherein the providing means comprises a transistor.

15. The power supply of claim 13, wherein the providing means of the power supply provides a ground potential to another one of the power supply.

16. The power supply of claim 13, wherein:
the unit has only two power supplies, and
the reference value circuit sets the reference value for single converter operation at twice the reference value for two converter operation.

17. A power supply for use in a multiple power supply unit that includes a plurality of the power supplies which provide electrical power in parallel to a load, the power supply comprising:
means for detecting excess output current to the load relative to a reference value;
means for providing an operation indication of the power supply to another one of the power supplies;
means for receiving the operation indication from another one of the power supplies; and
means for changing the reference value based on a total number of individual power supplies from which the operation indication is received.

18. A power supply for use in a multiple power supply unit that includes first and second power supplies which provide electrical power in parallel to a load, the power supply comprising:
a transformer including a primary circuit and a secondary circuit, the primary circuit connecting to a power source, and the secondary circuit connecting to the load;
means for extracting a voltage generated across a resistor in the secondary circuit;
means for detecting excess output current to the load by comparing the generated voltage to a reference voltage;
means for controlling an input to the primary circuit from the power source, based on whether the excess current is detected;
means for providing an operation indication, of the power supply, each of the first and second power supplies to receive the operation indication of the second and first power supplies, respectively; and
means for changing the reference voltage based on a total number of individual power supplies from which the operation indication is received.

19. The power supply of claim 17, wherein the controlling means comprises:
means connected to the power source for switching the input to the primary circuit; and
means for controlling the switching means to cut off the input to the primary circuit when the excess current is detected.

20. The power supply of claim 17, further comprising:
an output terminal on which the providing means provides the operation indication; and
an input terminal on which the changing means of the first and second power supply receives the operation indication of the second and first power supply, respectively;
wherein the output terminal and input terminal of the first power supply are respectively coupled to the input terminal and output terminal of the second power supply.

21. The power supply of claim 17, wherein the providing means comprises a transistor.

22. The power supply of claim 17, wherein the providing means of the power supply provides a ground potential to another one of the power supplies.

23. The power supply of claim 17, wherein the changing means sets the reference voltage for single converter operation at twice the reference voltage for two converter operation.

* * * * *